United States Patent [19]

Katayama

[11] Patent Number: 4,563,045
[45] Date of Patent: Jan. 7, 1986

[54] BEARING UNIT FOR SLIDING DEVICE

[76] Inventor: Ichiro Katayama, No. 23-1, 2-chome, Chuo, Ohta-ku, Tokyo, Japan

[21] Appl. No.: 628,628

[22] Filed: Jul. 6, 1984

[30] Foreign Application Priority Data

Oct. 14, 1983 [JP] Japan .............................. 58-190645

[51] Int. Cl.$^4$ ............................................. F16C 29/06
[52] U.S. Cl. ..................................................... 308/6 C
[58] Field of Search ............... 308/3 A, 6 R, 6 C, 3 R

[56] References Cited

U.S. PATENT DOCUMENTS 3,964,802  6/1976  Pitner .................................. 308/6 C

FOREIGN PATENT DOCUMENTS 1275060  9/1961  France ................................ 308/6 C Primary Examiner—Stuart S. Levy
Assistant Examiner—David Werner
Attorney, Agent, or Firm—Wenderoth, Lind & Ponack

[57] ABSTRACT

The present invention provides a bearing unit which comprises a bearing unit body mounted on a sliding unit, a plurality of guiding surfaces including a guiding surface being formed on said bearing unit body so as not to intersect another guiding surface, and a plurality of roller units having a plurality of rolls endlessly connected to each other and being provided on said guiding surfaces such that said rolls of the roller units are rotatably in contact with the guiding surfaces and each of said roller units are not in contact with each other. The invention further provides a sliding device which employs effectively the above described bearing unit to perform the high performance sliding operation.

2 Claims, 7 Drawing Figures

BEARING UNIT FOR SLIDING DEVICE

BACKGROUND OF THE INVENTION

1. Field of the Invention

The present invention relates to a sliding device for use with a machine tool, a measuring device or the like, and more particularly to an improvement of a bearing unit which is used in the sliding device.

2. Description of the Prior Art

In the prior art sliding device, there is shown a ball bearing unit for linear motion wherein said slide unit is mounted on a track rail of rectangular cross section which is provided with linear track surfaces symmetrically at both vertical side surfaces. The slide unit is provided with track surfaces opposing said track surfaces on said track rail with linear return holes running parallel to said track surfaces. Direction changing paths connect corresponding ends of said track surfaces and return holes respectively. The slide unit is further formed with circulating paths where groups of balls endlessly circulate and support a load while rolling between both track surfaces.

In the prior art ball bearing unit, a load is supported by many numbers of balls which are rotatably inserted into the circulating paths having circular cross sections. According to the prior art ball bearing unit, there will occur friction between inner surfaces of the circulating paths and the balls. Moreover, each of the balls contacts the inner wall of the circulating path. Accordingly, there were defects in that the load capacity of the slide unit was decreased and in that the inner surface of the circulating path was damaged. Moreover, there were defects in that there would occur the collision of adjacent balls, since each of the balls is rotatably provided in the circulating path individually and in that it was very difficult to obtain high precision manufacturing of the circulating path.

SUMMARY OF THE INVENTION

It is an object of the present invention to provide a sliding device having an improved bearing unit which can convey a load to be conveyed.

It is a further object of the present invention to provide a bearing unit for enhancing sliding performance and durability as well as being easy to manufacture.

According to the present invention, there is provided a bearing unit for a sliding device in which a sliding unit is slid along a slide guiding member for guiding sliding motion of said sliding unit, wherein said bearing unit comprises a bearing unit body mounted on said sliding unit, guiding surfaces being formed on said bearing unit so as not to interact with each other, and roller means including a plurality of roller units having a plurality of rolls endlessly connected to each other and being provided on said guiding surfaces such that said rolls of the roller units are rotatably contacted by said guiding surfaces and each of said roller units are not contacted by other roller units.

According to the present invention, there is further provided a sliding device comprising a slide guiding member for guiding sliding motion and including a guiding surface, and a sliding unit sliding along said slide guiding member and including a sliding unit body and a bearing unit mounted on said sliding unit body and located between said sliding body and said sliding unit body, wherein said bearing unit comprises a bearing unit body mounted on said sliding unit body, guiding surfaces being formed on said bearing unit body so as not to intersect each other and such that at least a portion are opposed to said guiding surface of said sliding member, and roller means having a plurality of roller units including a plurality of rolls endlessly connected to each of the rolls and being provided on said guiding surfaces such that said rolls of the roller units are rotatably contacted with said guiding surfaces and each of said roller units are not contacted by other roller units.

DESCRIPTION OF THE PREFERRED EMBODIMENTS

Figure 1:
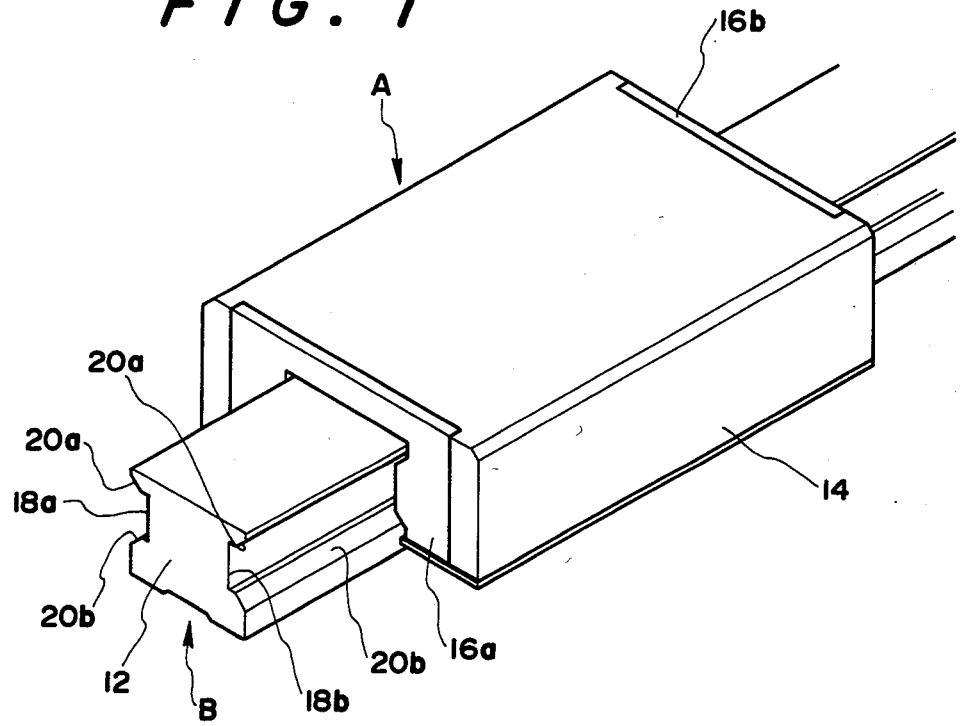
FIG. 1 is a perspective view of a sliding device of an embodiment according to the present invention.

Referring to the drawings in more detail, particularly to FIG. 1, there is shown a sliding device according to an embodiment of the present invention. As is shown in FIG. 1, the sliding device comprises, substantially, a sliding unit A and a guiding member B for guiding the sliding motion of the sliding unit A. The sliding unit A comprises a bearing unit C (FIG. 2) for aiding the sliding motion of the sliding unit A. The guiding member B includes a track rail 12 on which the sliding unit A is mounted slidably by means of the bearing unit C.

In more detail, the sliding unit A comprises a channel shaped slide unit body 14 slidably mounted on the track rail 12 of the guiding member B and a pair of covers 16a and 16b, each of which is accomodated on both ends of the slide unit body 14. The track rail 12 is formed with longitudinal slots 18a and 18b which are provided on both sides of the track rail 12. The slots 18a and 18b are, respectively, provided with tapered and plane guiding surfaces 20a and 20b.

Figure 2:
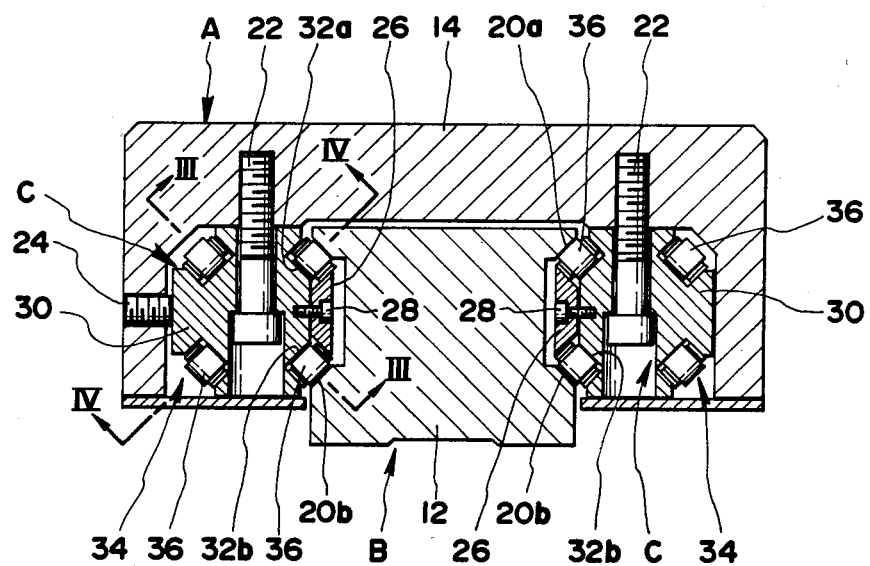
FIG. 2 is a vertical sectional front view of a sliding device of FIG. 1.
Figure 3:
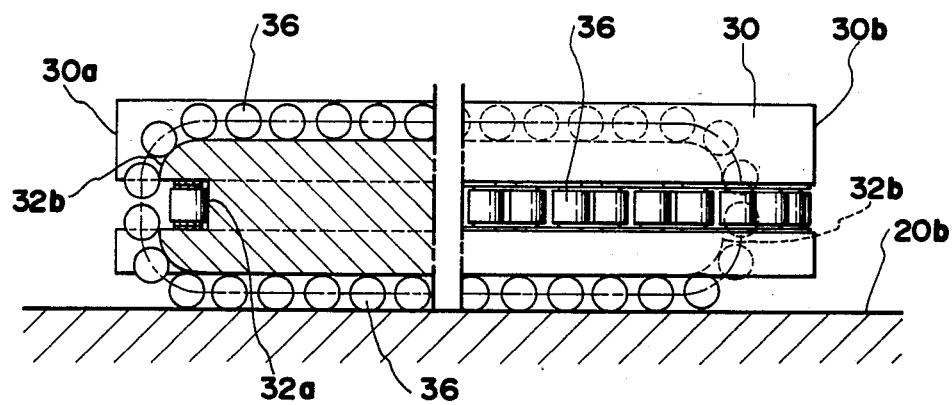
FIG. 3 is a sectional view of a bearing unit of the present invention taken along line III—III of FIG. 2.
Figure 4:
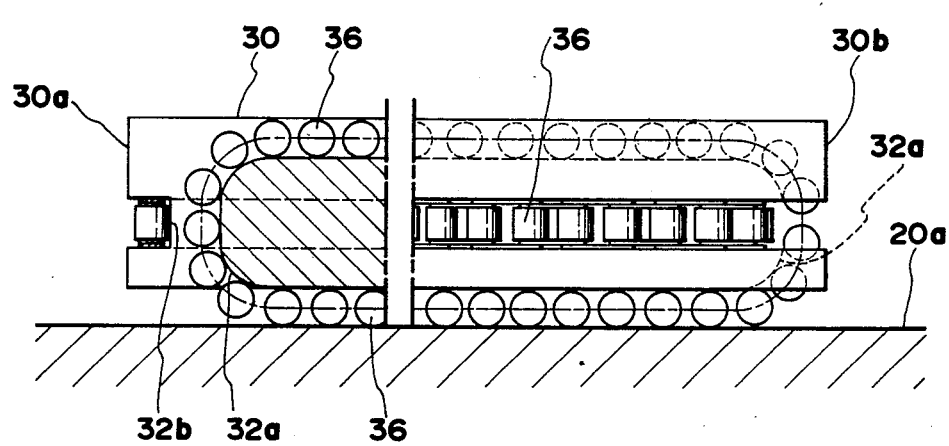
FIG. 4 is a sectional view of the bearing unit of the present invention taken along line IV—IV of FIG. 2.

As is best shown in FIG. 2, a pair of bearing units C are fastened to an inner surface of the sliding unit body 14 by fastening members. The fastening member includes a fastening bolt 22, a pressing screw 24, a fastening plate 26, and a fastening screw 28. The bearing unit C comprises a bearing unit body 30, a pair of quadrangular guiding slots 32a and 32b which are provided endlessly on the bearing unit body 30 and a pair of chain-rollers 34, which are slidably provided in the guiding slots 32a and 32b. As is shown in FIGS. 3 and 4, the guiding slot 32a is provided on opposing and diagonal edge portions of the bearing unit body 30 along with the longitudianl direction and is directed toward the opposing diagonal edge portions of both ends 30a and 30of the bearing unit body 30. The guiding slot 32b is provided on the other opposing and diagonal edge portions of the bearing unit body 30 and on both ends 30a and 30b of the bearing unit body 30. In one end portion 30a of the bearing unit body 30, the guiding slot 32a has a greater depth than that of the guiding slot 32b. In the other portion 30b of the bearing unit body 30, the guiding slot 32b has a greater depth than that of the guiding slot 32a. The individual rolls 36 are slidably fitted into the guiding slots 32a and 32b.

As is clearly shown in FIG. 3, the guiding slot 32b has a discontinuous surface at the end 30a of the bearing unit body 30. As is likewise clearly shown in FIG. 4, the guiding slot 32a has a discontinuous surface at the end 30b of the bearing unit body 30.

Figure 5:
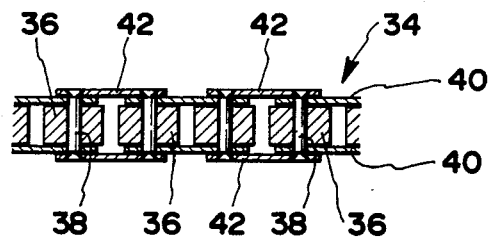
FIG. 5 is a plan view of a roller means employed in a bearing unit of the present invention.

As is shown in FIG. 5, roller means in the form of the chain-roller 34 is formed with a plurality of rolls 36 endlessly connected to each other. Each of the rolls 36 is supported to a shaft 38 of which both end portions are rotatably supported by a pair of supporting plates 40, and both ends portions of each roll 38 are rotatably connected by a pair of retainers 42 to form an endless chain-roller 34.

As described above in reference to FIG. 2, a sliding member in the form of the sliding unit 14 carries a load to be conveyed. The pairs of bearing units C are positioned at both sides of the track rail 12 of the guiding member B. The sliding unit body 14 of the sliding unit A is supported on the track rail 12 by way of the bearing units C so as to be mutually slidable with each bearing unit C. The rolls 36 of the chain-roller 34 are rotatably contacted with the guiding surfaces 20a, 20b of the track rail 12 and plane bottom surfaces of the guiding slots 32a and 32b of the bearing unit C. The guiding surfaces 20a and 20b are provided at upper and lower side positions in contact with side surfaces of the track rail 12 along the longitudinal direction thereof so as to oppose the guiding slots 32a and 32b provided in the edge portions of the bearing unit body 30 along the longitudinal direction. The guiding surfaces of the guiding slots 32a and 32b are formed by flat planes, and the guiding surfaces 20a and 20b are also formed by flat planes.

The sliding unit body 14 is slidably mounted on the track rail 12 by way of the chain-rollers 34 arranged on the bearing unit body 30 so as to be mutually slidable with each other. Each of the rolls 36 of the chain-roller 34 contacts the guiding surfaces of the guiding slots 32a and 32b. The guiding slots 32a and 32b are endlessly provided longitudinally on both end portions 30a and 30b (FIGS. 3 and 4) of the bearing unit body 30. The guiding slot 32a crosses with the guiding slot 32b so as not to intersect with each other.

As is shown in FIG. 2, the rolls 36 of the pair of endless chain-rollers 34 are rotatably inserted between the guiding slots 32a and 32b and the guiding surfaces 20a and 20b of the track rail 12. The chain-rollers 34 are not also in contact with each other, since the guiding slots 32a and 32b do not intersect with each other at both end portions 30a and 30b of the bearing unit body 30, and therefore the sliding unit A can be reciprocally slided along the guiding member B.

Figure 6:
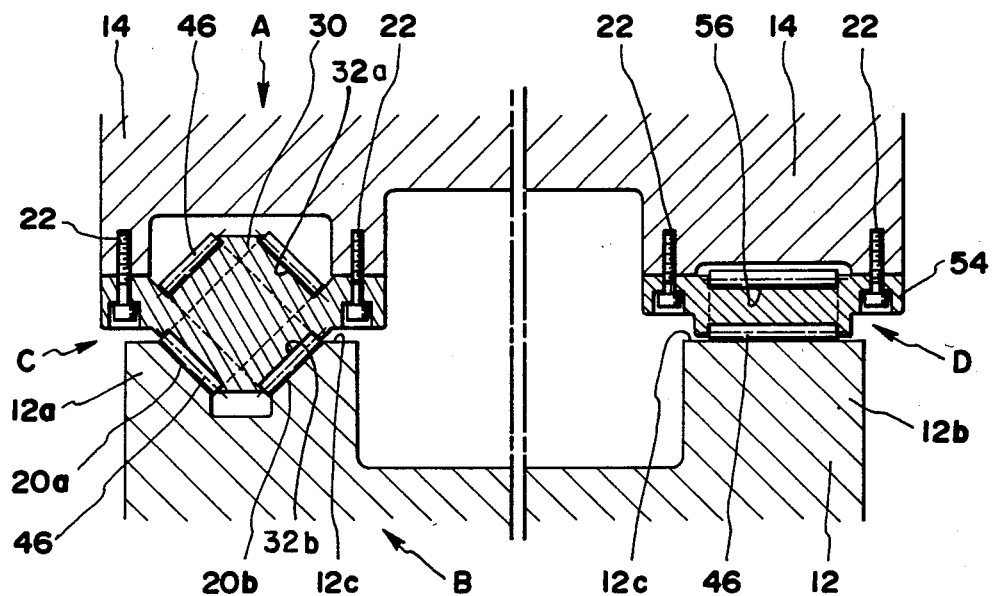
FIG. 6 is a vertical sectional view of a sliding device of the other embodiment according to the present invention.

FIG. 6 shows another embodiment of the sliding device according to the present invention.

Figure 7:
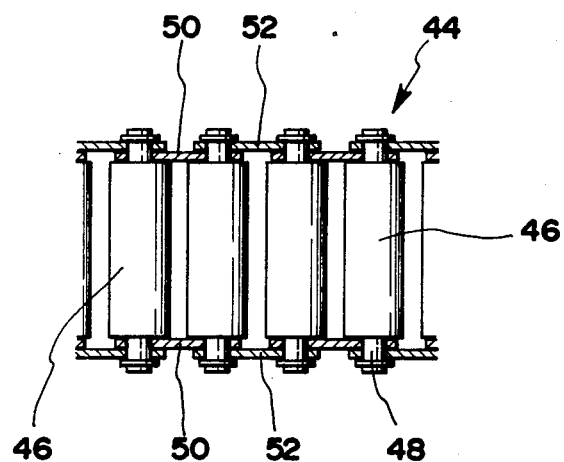
FIG. 7 is a plan view of a roller means employed in the sliding device of FIG. 6.

In the sliding device shown in FIG. 6 a bearing unit C according to the invention and a conventional bearing unit D are employed with a sliding unit A. A bearing unit C comprises a bearing unit body 30 fastened to a sliding unit body 14, a first guiding slot forming a flat guiding surface 32a which is provided on one pair of opposing surfaces of the bearing unit body 30 and on both end portions of the bearing unit body 30, a second guiding slot forming a flat guiding surface 32b which is provided on the other pair of opposing side surfaces and on both end portions of the bearing unit body 30, and roller units 46 in the form of chain-rollers 44. As is shown in FIG. 7, the chain-roller unit 44 comprises a plurality of rolls 46 each of which is rotatably supported by a shaft 48 and a pair of supporting frames 50. Each of the shafts 48 is rotatably connected by retainers 52. Returning to FIG. 6, a slide guiding member in the form of a track rail 12 is provided with projections 12a and 12b having flat top surfaces 12c. The projection 12a is provided with a rectangular longitudinal slot which forms guiding surfaces 20a and 20b. The bearing unit body 30 is fastened to a lower side of the sliding unit body 14 by fastening bolts 22. The bearing unit D comprises a bearing unit body 54, a rectangular guiding slot 56 provided on the bearing unit body 54 such that the guiding slot 56 surrounds longitudinally the bearing unit body 54. The bearing unit D is secured to the sliding unit body 14 by the fastening bolts 22.

According to the present invention, a pair of guiding surfaces having a flat plane are provided on a bearing unit body so as to interlink with each other and so as to comprise a two level crossing for each chain-roller which is movably mounted on the guiding surfaces to form a bearing unit. Accordingly, rolls supporting a load are in contact with the guiding surface and thereby durability of a bearing unit is increased to five to ten times better when compared with that of a conventional bearing unit.

According to the present invention, moreover, each of rolls of a roller unit is pulled and smoothly rolls on a guiding surface when the sliding unit slides, and thereby the collision of each of the rolls is completely avoided to make the friction forces small. Accordingly, it is possible to slide the sliding unit smoothly.

In addition, according to the present invention, it is easy to manufacture a sliding device with high precision and high durability.

In view of the above disclosure, it will be seen that the several objects of the invention are achieved and other advantageous results are attained.

While preferred embodiments have been shown and described, it will be apparent to those skilled in the art that modifications can be made without departing from the principle and spirit of the invention, the scope of which is defined in the appended claims. Accordingly, rather than restricting the invention, those modifications which come within the meaning and range of equivalency of the claims are to be included herein.

What is claimed is:

1. A bearing unit for a sliding device in which a sliding unit slides along a guiding member having guiding surfaces, said bearing unit comprising:
   a bearing unit body mounted between the sliding unit and the guiding member, said bearing unit body having a generally quadrangular cross-section with two pairs of diagonally opposing edge portions and two end portions;
   a first guiding slot forming a first circulating path with a first return section having an open side, said first circulating path being provided on one pair of diagonally opposing edge portions and around both end portions of the bearing unit body;
   a second guiding slot forming a second circulating path with a second return section having an open side, said second circulating path being provided on the other pair of diagonally opposing edge portions and also around both end portions of the bearing unit body;

a first roller unit having a first plurality of rolls out of contact with but connected to each other in an endless chain and being slidably arranged in the first circulating path formed by the first guiding slot;

a second roller unit having a second plurality of rolls out of contact with but connected to each other in an endless chain and being slidably arranged in the second circulating path formed by the second guiding slot;

said first guiding slot having a depth greater than the depth of the second guiding slot at one of the two end portions of the bearing unit body;

said second guiding slot having a depth greater than the depth of the first guiding slot at the other of the two end portions of the bearing unit body;

whereby the first and second pluralities of rolls encounter no friction on the open sides of the first and second return sections of the first and second circulating paths and, further, whereby each of the first and second pluralities of rolls remain completely out of contact with each other while traveling in the first and second circulating paths so that no friction is likewise encountered between the rolls.

2. A sliding device comprising:

a member for guiding sliding motion;

a unit for sliding along the member;

a bearing unit body mounted between the sliding unit and the guiding member, said bearing unit body having a generally quadrangular cross-section with two pairs of diagonally opposing edge portions and two end portions;

a first guiding slot forming a first circulating path with a first return section having an open side, said first circulating path being provided on one pair of diagonally opposing edge portions and around both end portions of the bearing unit body;

a second guiding slot forming a second circulating path with a second return section having an open side, said second circulating path being provided on the other pair of diagonally opposing edge portions and also around both end portions of the bearing unit body;

a first roller unit having a first plurality of rolls out of contact with but connected to each other in an endless chain and being slidably arranged in the first circulating path formed by the first guiding slot;

a second roller unit having a second plurality of rolls out of contact with but connected to each other in an endless chain and being slidably arranged in the second circulating path formed by the second guiding slot;

said first guiding slot having a depth greater than the depth of the second guiding slot at one of the two end portions of the bearing unit body;

said second guiding slot having a depth greater than the depth of the first guiding slot at the other of the two end portions of the bearing unit body;

whereby the first and second pluralities of rolls encounter no friction on the open sides of the first and second return sections of the first and second circulating paths and, further, whereby each of the first and second pluralities of rolls remain completely out of contact with each other while traveling in the first and second circulating paths so that no friction is likewise encountered between the rolls.

* * * * *